Oct. 19, 1937.  J L. NELSON  2,096,288
SUBVALVE
Filed Nov. 18, 1935  2 Sheets-Sheet 1
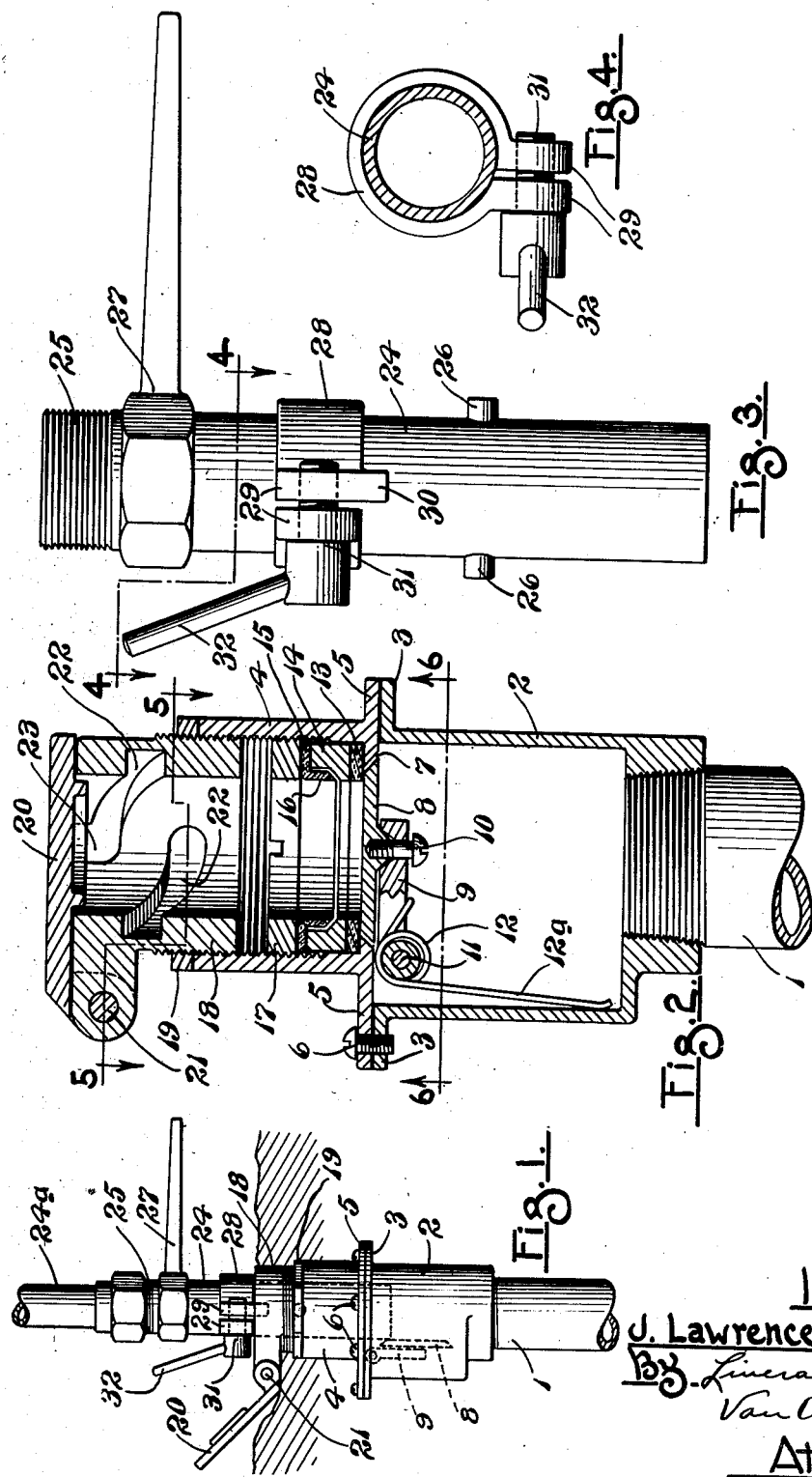
Inventor
J. Lawrence Nelson
By Liverance and
Van Antwerp
Attorneys Oct. 19, 1937.     J L. NELSON     2,096,288
SUBVALVE
Filed Nov. 18, 1935     2 Sheets-Sheet 2

Inventor
J. Lawrence Nelson
By Liverance and
Van Antwerp
Attorneys

Patented Oct. 19, 1937

2,096,288

UNITED STATES PATENT OFFICE 2,096,288

SUBVALVE

J. Lawrence Nelson, North Muskegon, Mich.

Application November 18, 1935, Serial No. 50,416

5 Claims. (Cl. 284—19)

This invention relates to a valve structure particularly adapted to be used with underground irrigation systems, and which is adapted to be applied at the upper end of a riser pipe leading from a main pipe which extends underneath the surface. One of the valve structures of the invention is attached at the upper end of each riser pipe, a number of which may be interposed in the length of a main water carrying pipe.

The valve structure of my invention is located so that a cover at its upper end will lie substantially flush with the ground. Valve means within the structure serve normally to stop any flow of water. By use of a tubular member, which may be inserted downwardly in the upper end of the valve structure, the valve, which closes against the outflow of water, may be moved to either partial or entirely open position so that the water flows in desired quantity through said tubular member which is equipped at its upper end for the attachment of a hose or other means of further distribution.

It is a primary object and purpose of the present invention to provide a particularly practical, durable, efficient and very satisfactory valve structure for the purposes described, and by means of which there is no partial interruption of and turbulence in the flow of water outward by reason of the interposition of the valve wholly or partly in the stream of water which flows when the valve is opened. Many other objects and purposes will be apparent as an understanding is had of the invention from the following description, taken in connection with the accompanying drawings, in which, Fig. 1 is an elevation illustrative of the invention in use.

Fig. 2 is a substantially central vertical section through the valve structure of my invention.

Fig. 3 is an elevation of the tubular member used to open the valve and to serve as a conduit for the outflow of water.

Fig. 4 is a horizontal section substantially on the plane of line 4—4 of Fig. 3.

Figure 5:
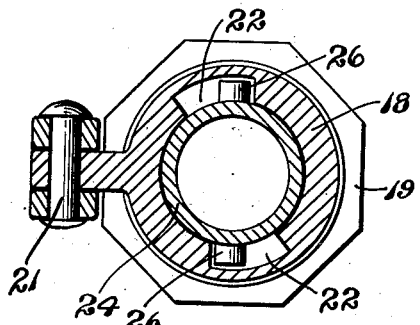
Figure 6:
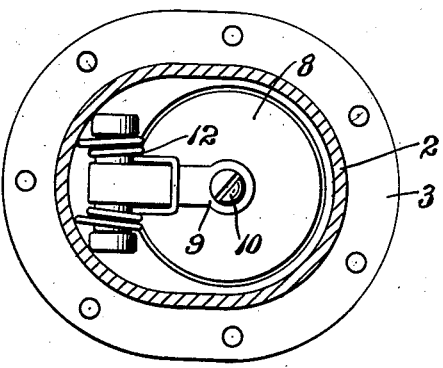
Figure 7:
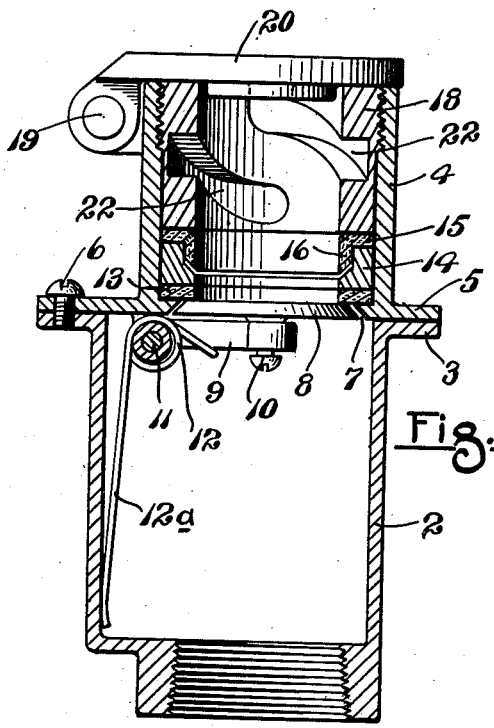

Figs. 5 and 6 are horizontal sections, respectively, on the planes of lines 5—5 and 6—6 of Fig. 2, looking in the directions indicated by the arrows, and Fig. 7 is a view similar to that shown in Fig. 2 illustrating a slight modification in construction.

Like reference characters refer to like parts in the different figures of the drawings.

The valve structure of my invention is adapted to be connected at the upper end of a vertical riser pipe 1 any desired number of which may extend upwardly at spaced distances from a main carrying water pipe. The structure includes a lower housing 2 having a threaded opening in its lower side whereby it may be screwed on the upper end of the riser 1. The housing 2 has an open upper end and, an annular outwardly extending flange 3 around the same.

Above the housing 2 a second housing 4 is located which is provided at its lower end with an outwardly extending flange 5 extending over and bearing upon the previously described flange 3, the two being securely connected together by screws 6. Any suitable gasket may be interposed between the flanges to insure against leakage of water. The lower side of the upper housing 4 has an opening 7 of relatively large size and preferably with upwardly and inwardly extending tapered sides as shown. A flat valve 8, slightly less in diameter than the opening 7, and with a peripheral edge shaped to correspond with the sides of the opening 7 is mounted at its center upon an arm 9 located below it. The mounting is a loose one by means of a screw 10 which passes through the arm 9 and threads into the valve 8, the head of the screw being spaced a short distance from the underside of the arm 9 so that the valve may have a slight rocking movement with respect to the arm 9 when needed. The valve is mounted at the inner end of the arm 9, while the outer end is pivotally mounted on a pivot pin 11 which extends between suitable supports cast integral with the housing 4. A coiled torsion spring 12 has one arm extending underneath the arm 9 and the other arm, 12a, extending downwardly along the inner side of the housing 2, as shown in Fig. 2, whereby valve 8 is normally held in upper position, the strength of the spring being sufficient to overcome the weight of the valve and the arm 9. However, by pressing downwardly upon the upper side of the valve the arm 9 is turned about the pivot 11 so as to move the valve from its upper horizontal position to substantially a vertical position as shown in dotted lines in Fig. 1.

A valve seat ring 13 of leather or other suitable material is located in the bottom of the housing 4 resting upon the ledge surrounding the opening 7 and having inwardly extending edge portions against which the outer edge portions of the valve 8 bear as shown in Fig. 2. The housing 4 is interiorly threaded. A metal ring 14 is slipped downwardly therein against the upper side of the leather 13 to securely retain the same in place. Above the retaining ring 14 is a second member of leather or other suitable equivalent material having a horizontal portion 15 resting upon the upper side of the ring 14, and a downwardly extending inner annular portion 16 which is located in an annular recess made at the inner side and upper part of the ring 14. A metal clamping ring 17 is threaded downwardly into the housing to bear upon and clamp against the horizontal portion 15 previously described. The interior diameter of all of the members 13, 14, 16 and 17 are substantially the same so as to make a vertical opening through the parts above the valve 8 having a substantially uniform diameter.

In the upper end of the housing 4 a member 18 is threaded to any desired position and is held in any position to which adjusted by a lock nut 19 around the same and bearing against the upper end of the housing 4. The member 18 likewise has a vertical opening therethrough of the same diameter as the opening through the parts 13 to 17. The upper end of the member 18 is closed by a cover 20, hinged at one side at 21 to a lug projecting from member 18 whereby the open upper end may be closed as shown in Fig. 2; or the cover may be turned to wholly uncover the vertical opening which leads downwardly to the valve 8. At the inner side of the member 18 are two helical grooves 22 which begin at the upper edges of the opening through the member 18, at diametrically opposite points, and extend vertically downward a short distance as indicated at 23, and then extend as helical grooves downwardly and around the inner sides of the vertical opening through said member 18.

A vertical tubular member 24 is threaded at its upper end at 25 to provide means for detachably connecting a liquid conduit such as 24a thereto. The exterior diameter of the tubular member 24 is slightly less than the interior diameter of the vertical opening through the member 18 and the retaining ring 14 and clamping ring 17. At a distance above the lower end of the tubular member 24 two diametrically opposed lugs 26 are secured ether by welding thereto, by casting therewith or in any other suitable manner, while adjacent the upper end of the member 24 a handle 27 is secured for manually turning the member about its longitudinal vertical axis.

When it is desired to have water escape and pass outwardly through the conduit at 24a the cover 20 is thrown back, and the lower end portion of the tubular member 24 inserted downwardly through the member 18 and the other parts described to engage against the upper side of the valve 8. The lugs 26 follow the grooves 22, and by operating the handle 27 member 24 may be forced downwardly by a screw action and the valve 8 either partially or wholly opened. The distance that the valve 8 will be opened is dependent upon the position of the member 18. If it is raised to an upper position the lugs 26 come sooner to the lower ends of the helical grooves 22 and the valve 8 will not be opened to as great a degree as if the member 18 was adjusted downwardly to a lower position within the housing 4.

In Fig. 1 the valve 8 is shown in dotted lines as moved to fully open position. It is evident that in such case the water flows without restriction and without turbulence directly from the riser pipe 1 through the tubular member 24 and thence through the conduit. If the valve 8 is not so fully opened the water still flows with a substantially free movement around the edge of the valve to the open lower end of the tubular member 24 but in a restricted amount depending upon the extent of the valve opening.

In Fig. 7 a slight modification in structure is shown. It consists in eliminating the clamping ring member 17 and lock nut 19 and in screwing the member 18 downwardly against the leather washer 15 to clamp it against the ring 14. In such case the member 18 is housed wholly within the housing 4 and is not adjustable to different vertical positions. Otherwise the structure is substantially the same. With such form of structure in order to open the valve partially the tubular member 24 is equipped with a split collar 28 around it and above the lugs 26, having two ears 29 extending therefrom at the division in the collar, from one of which a lug 30 extends downwardly and is located substantially in an extension of a diameter of the tubular member 24. Such lug is of a size that it is received readily in the vertical portion 23 of either of the two helical grooves 22. A clamping screw 31 passes through the lug 29 and may be loosened or tightened by a handle 32.

In the operation of this form of structure the tubular member 24 is inserted downwardly so as to engage at its lower end with the valve 8 and the handle 27 operated to open the valve to desired extent. The collar 28 is loose upon the tubular member 24. When the desired opening of the valve 8 has been attained, collar 28 is moved so that the lug 30 enters the vertical upper end 23 of one of the helical grooves 22 and then the handle 32 is operated to clamp the collar upon the member 24. This prevents any further turning movement so that the member 24 may be located at any desired position and with the lugs 26 above the lower ends of the helical grooves 22. It is, of course, apparent that the same operation may be performed in the structure shown in Fig. 2 in the matter of opening the valve 8 to a greater or less degree.

The annular downwardly extending portion 16 of the leather packing described is designed to bear against the sides of the tubular member 24 so that there will be no leakage of water past the same; and the water passing in behind said downwardly extending portion 16, by its pressure will force the same against the member 24. When the conduit is to be disconnected it is necessary merely to disconnect the tubular member 24, the valve 8 automatically closing and being held in closed position both by the force of the spring 12 and by the greater force of the pressure of water back of it to hold it against the seat 13.

The valve 8, if swung upwardly far enough, can engage the edge of the opening 7 in the lower side of the housing 4 to substantially close the opening and prevent the passage of water to any great extent therethrough. Although the valve seated against the edge of the opening 7 is not the usual method of closing the opening and probably will not form a wholly tight closure, it permits the removal of the parts above the valve for repair or replacement without shutting off the supply of water at its source and prevents passage of water from the device in any considerable volume during such repair.

The construction described is very practical, efficient and durable. It is readily manufactured and assembled at a low cost. The invention is defined in the appended claims and is to be considered comprehensive of all forms of structure coming within their scope.

I claim:

1. In combination, a vertically positioned riser pipe adapted to carry water under pressure, a hollow housing open at its upper end connected to the upper end of said riser pipe and adapted to receive water therefrom, a second housing secured to and covering the upper end of the first housing, said second housing being open at its upper end and having an opening at its lower end, a valve disposed in said opening, a pivotally mounted arm located within the first housing carrying said valve, spring means acting on said arm normally tending to move the valve to upper position, a seating ring in the bottom of the second housing against which the valve bears, a retaining ring located against the seating ring to hold it in place, a member of flexible material having a horizontal portion bearing upon the upper side of the retaining ring, and a downwardly extending cylindrical annular portion located within said retaining ring, means threading into the second housing against said flexible member to clamp the same in place, said seating and retaining rings, flexible member and last mentioned means having central vertical openings therethrough, whereby a tubular pipe may be inserted to press against the valve to open the same.

2. A construction containing the elements in combination defined in claim 1, combined with said tubular pipe and means for controlling the distance said pipe may be inserted and for holding the same in the position to which it is inserted, as and for the purposes specified.

3. In a construction of the class described, a hollow housing adapted to be positioned vertically having an open upper end and adapted to be connected at its lower end with a vertical riser pipe, a second housing located above and covering the upper end of the first housing, means for connecting the housings together, said second housing having an open upper end and an opening in its lower end, a valve for closing said opening, means for mounting the valve whereby the same may be swung downwardly and to one side within the first housing, spring means for returning the valve to initial position, a seat in the second housing against which the valve bears, and a cylindrical member having a central vertical longitudinal opening therethrough threaded into the upper part of the second housing, said cylindrical member having two helical grooves extending from diametrically opposed points at the upper end thereof downwardly and around the vertical opening through said cylindrical member whereby a pipe may be inserted therethrough against the upper side of the valve to unseat the same and permit the tube to aline with said riser pipe.

4. A construction containing the elements in combination defined in claim 3, said helical grooves at their upper ends having short vertical portions, a split collar surrounding the pipe above said lugs, means for releasably clamping said collar to the pipe, and a projection on said collar adapted to enter the vertical portion at the upper end of either of said grooves.

5. In a device of the class described, a hollow housing having an open upper end, a second housing connected to the first housing and covering said open upper end thereof and having an opening in the bottom thereof, a valve movably mounted within the first housing adapted to enter said opening, a seat against which the valve engages located in the second housing, means for clamping said seat in place, and a member located in the upper portion of the second housing, said member and seat having central, vertical, longitudinal alined openings therein leading to the upper side of said valve, and said member having a downwardly extending helical groove in the walls of said opening therein and means for adjusting said member to different positions in said second housing.

J. LAWRENCE NELSON.